(12) United States Patent
Noguchi

(10) Patent No.: US 11,557,761 B2
(45) Date of Patent: Jan. 17, 2023

(54) LITHIUM ION SECONDARY BATTERY

(71) Applicant: TOYOTA JIDOSHA KABUSHIKI KAISHA, Toyota (JP)

(72) Inventor: Chika Noguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 16/804,848

(22) Filed: Feb. 28, 2020

(65) Prior Publication Data

US 2020/0303733 A1    Sep. 24, 2020

(30) Foreign Application Priority Data

Mar. 20, 2019  (JP) .............................. JP2019-052922

(51) Int. Cl.
| | |
|---|---|
| *H01M 4/485* | (2010.01) |
| *H01M 10/0525* | (2010.01) |
| *H01M 10/058* | (2010.01) |
| *H01M 4/131* | (2010.01) |
| *H01M 4/1393* | (2010.01) |
| *H01M 4/36* | (2006.01) |
| *H01M 4/583* | (2010.01) |

(Continued)

(52) U.S. Cl.
CPC .......... *H01M 4/485* (2013.01); *H01M 4/131* (2013.01); *H01M 4/133* (2013.01); *H01M 4/1393* (2013.01); *H01M 4/364* (2013.01); *H01M 4/583* (2013.01); *H01M 4/621* (2013.01); *H01M 10/058* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2014/0106225 A1 | 4/2014 | Matsuno et al. | |
| 2018/0034112 A1* | 2/2018 | Goto | ..................... H01M 50/46 |
| 2018/0151869 A1* | 5/2018 | Matsuhara | .......... H01M 4/1393 |

FOREIGN PATENT DOCUMENTS

| | | | |
|---|---|---|---|
| JP | 2013004284 A | 1/2013 | |
| JP | 2018085286 A | 5/2018 | |

* cited by examiner

*Primary Examiner* — Wyatt P McConnell
(74) *Attorney, Agent, or Firm* — Dickinson Wright, PLLC

(57) ABSTRACT

Provided is a lithium ion secondary battery including $Li_4Ti_5O_{12}$ particles in a negative electrode active material layer and having both high heat generation suppressing performance during overcharging, and high storage stability in a high SOC region. The lithium ion secondary battery herein disclosed includes a positive electrode, a negative electrode, and a nonaqueous electrolyte. The positive electrode has a positive electrode active material layer. The positive electrode active material layer includes $Li_3PO_4$ as a secondary material. The negative electrode has a negative electrode active material layer. The negative electrode active material layer includes $Li_4Ti_5O_{12}$ as a secondary material. The $Li_3PO_4$ content in the positive electrode active material layer is 0.5 mass % or more and 5.0 mass % or less. The $Li_4Ti_5O_{12}$ content in the negative electrode active material layer is 0.5 mass % or more and 5.0 mass % or less.

5 Claims, 2 Drawing Sheets

(51) Int. Cl.
*H01M 4/62* (2006.01)
*H01M 4/133* (2010.01)
*H01M 4/02* (2006.01)

LITHIUM ION SECONDARY BATTERY

BACKGROUND OF THE INVENTION

1. Field of the Invention

The present disclosure relates to a lithium ion secondary battery. The present application claims priority on the basis of Japanese Patent Application No. 2019-052922 filed in Japan on Mar. 20, 2019, the entire contents of which are incorporated herein by reference.

2. Description of the Related Art

Lithium ion secondary batteries have been suitably used in recent years as potable power sources for personal computers, portable terminals, or the like, power sources for driving a vehicle such as electric vehicles (EVs), hybrid vehicles (HVs), or plug-in hybrid vehicles (PHVs), or the like.

Lithium ion secondary batteries have been demanded to have still higher performances with the widespread use thereof. For this reason, various techniques have been developed in order to enhance the performances of a lithium ion secondary battery. For example, Japanese Patent Application Publication No. 2018-085286 discloses a technique of incorporating lithium titanate ($Li_4Ti_5O_2$) particles as secondary materials in a negative electrode active material layer of a negative electrode of a lithium ion secondary battery. Further, Japanese Patent Application Publication No. 2013-004284 discloses a technique of incorporating spinel type lithium titanium oxide ($Li_4Ti_5O_{12}$) particles as main materials in a negative electrode active material layer of a negative electrode of a lithium ion secondary battery, and incorporating $Li_3PO_4$ in a surface portion of a positive electrode active material.

SUMMARY OF THE INVENTION

Meanwhile, the present inventor has conducted an intensive study, and as a result, have found that there is still room for improvement, in a conventional lithium ion secondary battery that includes $Li_4Ti_5O_{12}$ particles in the negative electrode active material layer, on the heat generation suppressing performance during overcharging and the storage stability in the high SOC (State of Charge) region.

Thus, it is an object of the present disclosure to provide a lithium ion secondary battery including $Li_4Ti_5O_{12}$ particles in a negative electrode active material layer, and having both a high heat generation suppressing performance during overcharging and high storage stability in a high SOC region.

The lithium ion secondary battery herein disclosed includes a positive electrode, a negative electrode, and a nonaqueous electrolyte. The positive electrode has a positive electrode active material layer. The positive electrode active material layer includes $Li_3PO_4$ as a secondary material. The negative electrode has a negative electrode active material layer. The negative electrode active material layer includes $Li_4Ti_5O_{12}$ as a secondary material. The $Li_3PO_4$ content in the positive electrode active material layer is 0.5 mass % or more and 5.0 mass % or less. The $Li_4Ti_5O_{12}$ content in the negative electrode active material layer is 0.5 mass % or more and 5.0 mass % or less.

Such a configuration provides a lithium ion secondary battery including $Li_4Ti_5O_{12}$ particles in the negative electrode active material layer and having both a high heat generation suppressing performance during overcharging, and high storage stability in the high SOC region.

In desirable one embodiment of the lithium ion secondary battery herein disclosed, the ratio of the $Li_3PO_4$ content in the positive electrode active material layer to the $Li_4Ti_5O_{12}$ content in the negative electrode active material layer is 0.5 or more and 1.2 or less.

With such a configuration, the heat generation suppressing performance during overcharging and the storage stability in the high SOC region become still higher.

In desirable one embodiment of the lithium ion secondary battery herein disclosed, the positive electrode active material layer includes positive electrode active material particles and $Li_3PO_4$ particles, and the ratio of the average particle diameter of the $Li_3PO_4$ particles to the average particle diameter of the positive electrode active material particles is 0.6 or more and 1.0 or less.

With such a configuration, the heat generation suppressing performance during overcharging and the storage stability in the high SOC region become still higher.

In desirable one embodiment of the lithium ion secondary battery herein disclosed, the negative electrode active material layer includes negative electrode active material particles and $Li_4Ti_5O_{12}$ particles, and the ratio of the average particle diameter of the $Li_4Ti_5O_{12}$ particles to the average particle diameter of the negative electrode active material particles is 0.5 or more and 0.8 or less.

With such a configuration, the heat generation suppressing performance during overcharging and the storage stability in the high SOC region become still higher.

DESCRIPTION OF THE PREFERRED EMBODIMENTS

Figure 1:
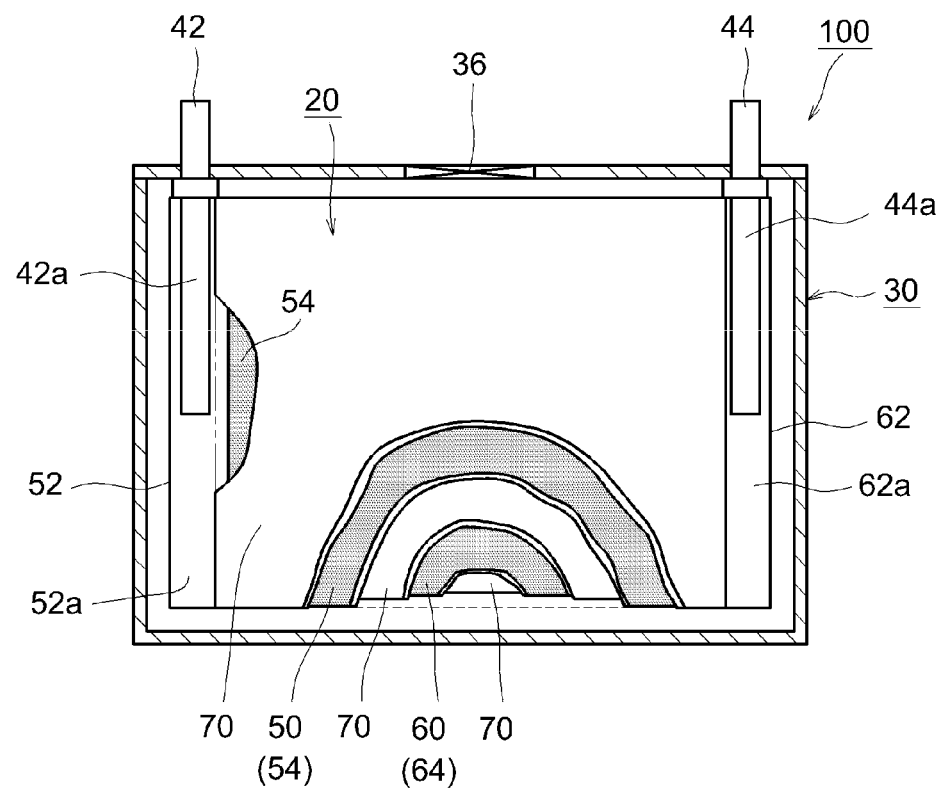
FIG. 1 is a cross sectional view schematically showing an internal structure of a lithium ion secondary battery in accordance with one embodiment of the present disclosure.

Referring to the accompanying drawings, embodiments of the present disclosure will be described below. Matters necessary for executing the present disclosure, except for matters specifically herein referred to (e.g., general configurations and manufacturing processes of a lithium ion secondary battery not being considered as characteristics of the present disclosure) can be understood as design matters of those skilled in the art based on the related art in the present field. The present disclosure can be executed based on the contents disclosed herein, and the common technical knowledge in the related field. Further, in the appended drawings, the members or portions exerting the same action are given the same reference numeral or sign for explanation. Further, the dimensional relation (such as length, width, or thickness) in each figure does not reflect the actual dimensional relation.

The term "secondary battery" used herein is a term representing an electric storage device capable of repeatedly performing charging and discharging in general, and including so-called electric storage elements such as a storage battery and an electric double layer capacitor.

The term "lithium ion secondary battery" represents a secondary battery including a nonaqueous electrolyte, using lithium ions as electric charge carriers, and implementing charging and discharging due to the movement of electric charges in association with the movement of lithium ions between the positive and negative electrodes.

The present disclosure will be described below in detail by taking a flat square lithium ion secondary battery having a wound electrode body in a flat shape and a battery case in a flat shape as an example. However, it is not intended to limit the present disclosure to a scope described in such an embodiment.

A lithium ion secondary battery 100 illustrated in FIG. 1 is a sealed lithium ion secondary battery 100 constructed by accommodating a wound electrode body 20 in a flat shape and a nonaqueous electrolyte (not illustrated) in a flat square battery case (i.e., an exterior container) 30. The battery case 30 is provided with a positive electrode terminal 42 and a negative electrode terminal 44 for external connection, and a thin-walled safety valve 36 set so as to relieve the internal pressure when the internal pressure of the battery case 30 increases to a prescribed level or higher. Further, the battery case 30 is provided with an inlet (not illustrated) for injecting a nonaqueous electrolyte. The positive electrode terminal 42 is electrically connected with a positive electrode collector sheet 42a. The negative electrode terminal 44 is electrically connected with a negative electrode collector sheet 44a. Examples of materials for the battery case 30 may include a metal material which is lightweight and has a good thermal conductivity such as aluminum.

Figure 2:
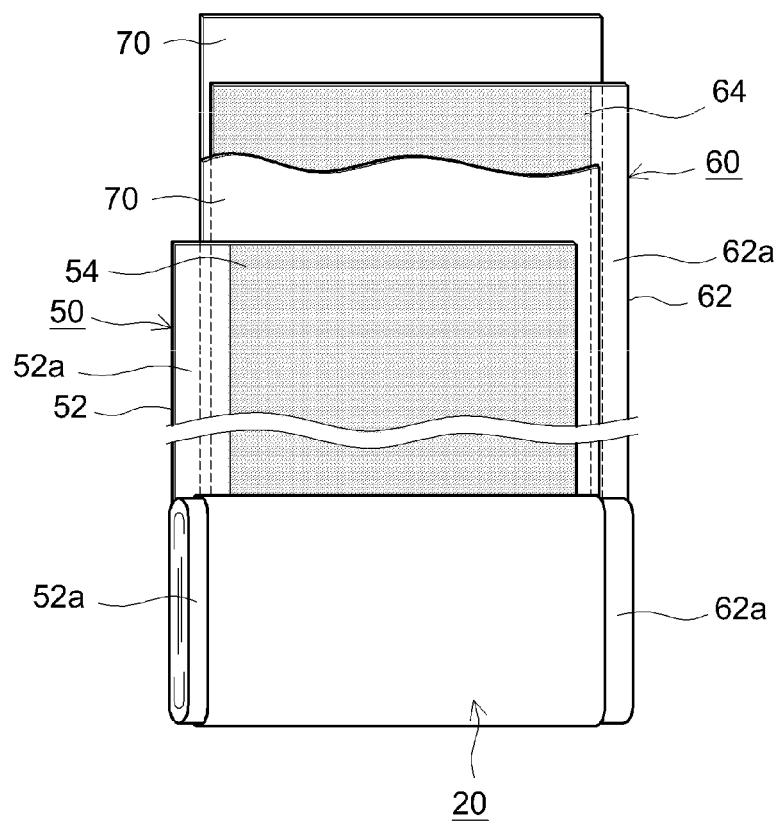
FIG. 2 is a schematic view showing a configuration of a wound electrode body of the lithium ion secondary battery in accordance with one embodiment of the present disclosure.

The wound electrode body 20 has a form, as illustrated in FIGS. 1 and 2, including a positive electrode sheet 50, which includes a positive electrode active material layer 54 that is formed along the longitudinal direction on one surface or both surfaces (both surfaces in this case) of a long positive electrode collector 52, and a negative electrode sheet 60, which includes a negative electrode active material layer 64 formed along the longitudinal direction on one surface or both surfaces both surface in this case) of a long negative electrode collector 62, where the positive electrode sheet 50 and the negative electrode sheet 60 are stacked while interposing two long separator sheets 70 therebetween and wound in the longitudinal direction. A positive electrode collector plate 42a and a negative electrode collector plate 44a are bonded to a positive electrode active material layer non-formation part 52a (i.e., the portion of the positive electrode collector 52 on which the positive electrode active material layer 54 is not formed thereon and which is exposed), and a negative electrode active material layer non-formation part 62a (i.e., the portion of the negative electrode collector 62 on which the negative electrode active material layer 64 is not formed thereon and which is exposed) formed so as to extend off outwardly from both ends in the winding axial direction (i.e., the sheet width direction orthogonal to the longitudinal direction) of the wound electrode body 20, respectively.

Examples of the positive electrode collector 52 constituting the positive electrode sheet 50 may include aluminum foil.

The positive electrode active material layer 54 includes $Li_3PO_4$ (which will also be hereinafter described as "LPO") as a secondary material. Further, the positive electrode active material layer 54 includes a positive electrode active material as a main material. The term "main material" herein represents a component of the largest content, and the "secondary material" denotes a component of a content smaller than that of the main material.

As the positive electrode active materials, materials capable of occluding and releasing lithium ions are used, and one or two or more of the substances conventionally used for a lithium ion secondary battery (e.g., an oxide with a layered structure and an oxide with a spinel structure) can be used without particular restriction. Examples of the positive electrode active material may include lithium-containing transition metal oxides such as lithium-nickel composite oxides, lithium-cobalt composite oxides, lithium-manganese composite oxides, lithium-nickel-manganese composite oxides (e.g., $LiNi_{0.5}Mn_{1.5}O_4$), and lithium-nickel-manganese-cobalt composite oxides (e.g., $LiNi_{1/3}Mn_{1/3}Co_{1/3}O_2$); and lithium transition metal phosphate compounds such as $LiFePO_4$. Out of these, lithium-nickel-manganese-cobalt composite oxides are desirable.

The content of the positive electrode active material is desirably 70 mass % or more in the positive electrode active material layer 54 (i.e., based on the total mass of the positive electrode active material layer 54).

LPO may be present in the form of particles, other particles than those of the positive electrode active material. Alternatively, LPO may be in a form compounded with the positive electrode active material. Specifically, for example, LPO may cover the positive electrode active material particles.

When the positive electrode active material layer 54 includes LPO as particles (i.e., when the positive electrode active material layer 54 includes the positive electrode active material particles and the LPO particles), the ratio of the average particle diameter of the LPO particles to the average particle diameter of the positive electrode active material particles (LPO particles/positive electrode active material particles) is desirably 0.6 or more and 1.0 or less. When the ratio of the average particle diameters falls within this range, the heat generation suppressing performance during overcharging and the storage stability in the high SOC region become still higher.

The average particle diameters of the positive electrode active material particles and the LPO particles can be determined in the following manner. First, the scanning electron microscope (SEM) image of the cross section of the positive electrode active material layer 54 is acquired. This image is subjected to energy dispersive X-ray spectrometry (EDX), thereby discriminating between the positive electrode active material particles and the LPO particles. For each of the positive electrode active material particles and the LPO particles, the diameter of the inscribed circle of the cross section of each particle is calculated. For 20 or more given particles, the diameters are determined, and the average value thereof is taken as the average particle diameter.

In order to obtain high heat generation suppressing performance during overcharging and high storage stability in the high SOC region, the LPO content in the positive electrode active material layer 54 is 0.5 mass % or more and 5.0 mass % or less. For more enhancing the effects, the LPO content is desirably 1.0 mass % or more and 4.0 mass % or less, and more desirably 1.5 mass % or more and 3.6 mass % or less.

The positive electrode active material layer 54 can include other components than the positive electrode active material and LPO. Examples thereof may include a conductive material and a binder.

As the conductive material, for example, carbon black such as acetylene black (AB), and other carbon materials (e.g., graphite) can be used suitably. The content of the conductive material in the positive electrode active material layer 54 is desirably 1 mass % or more and 15 mass % or less, and more desirably 3 mass % or more and 13 mass % or less.

As the binder, for example, polyvinylidene fluoride (PVdF) can be used. The content of the binder in the positive electrode active material layer 54 is desirably 1 mass % or more and 15 mass % or less, and more desirably 2 mass % or more and 10 mass % or less.

Examples of the negative electrode collector 62 constituting the negative electrode sheet 60 may include copper foil.

The negative electrode active material layer 64 includes $Li_4Ti_5O_{12}$ (which will also be described hereinafter as "LTO") as a secondary material. Further, the negative electrode active material layer 64 includes a negative electrode active material (except for LTO) as the main material.

Examples of the negative electrode active materials may include carbon materials such as graphite, hard carbon, and soft carbon. Graphite may be natural graphite or artificial graphite, and may also be an amorphous carbon-coated graphite in a form in which graphite is coated with an amorphous carbon material.

The content of the negative electrode active material in the negative electrode active material layer 64 is desirably 90 mass % or more, and more desirably 94 mass % or more.

LTO may be present in the form of particles, other particles than those of the negative electrode active material. Alternatively, LTO may be in a form complexed with the negative electrode active material. Specifically, for example, LTO may cover the negative electrode active material particles.

When the negative electrode active material layer 64 includes LTO as particles (i.e., when the negative electrode active material layer 64 includes negative electrode active material particles and LTO particles), the ratio of the average particle diameter of LTO particles to the average particle diameter of negative electrode active material particles (LTO particles/negative electrode active material particles) is desirably 0.5 or more and 0.8 or less. When the ratio of the average particle diameters falls within this range, the heat generation suppressing performance during overcharging and the storage stability in the high SOC region become still higher.

The average particle diameters of the negative electrode active material particles and LTO particles can be determined in the following manner. First, the scanning electron microscope (SEM) image of the cross section of the negative electrode active material layer 64 is acquired. This image is subjected to energy dispersive X-ray spectrometry (EDX), thereby discriminating between the negative electrode active material particles and the LTO particles. For each of the negative electrode active material particles and LTO particles, the diameter of the inscribed circle of the cross section of each particle is calculated. For 20 or more given particles, the diameters are determined, and the average value thereof is taken as the average particle diameter.

In order to obtain high heat generation suppressing performance during overcharging and high storage stability in the high SOC region, the LTO content in the negative electrode active material layer 64 is 0.5 mass % or more and 5.0 mass % or less.

The negative electrode active material layer 64 can include other components than the negative electrode active material and LTO, such as a binder and a thickener.

As the binder, for example, styrene butadiene rubber (SBR) can be used. The content of the binder in the negative electrode active material layer 64 is desirably 0.1 mass % or more and 8 mass % or less, and more desirably 0.5 mass % or more and 3 mass % or less.

As the thickener, for example, carboxymethyl cellulose (CMC) can be used. The content of the thickener in the negative electrode active material layer 64 is desirably 0.3 mass % or more and 3 mass % or less, and more desirably 0.5 mass % or more and 2 mass % or less.

The ratio (LPO/LTO) of the LPO content (mass %) in the positive electrode active material layer 54 to the LTO content (mass %) in the negative electrode active material layer 64 is desirably 0.5 or more and 1.2 or less. When the ratio in contents falls within this range, the heat generation suppressing performance during overcharging and the storage stability in the high SOC region become still higher.

As described above, by properly controlling the amount of LPO included in the positive electrode active material layer 54 and the amount of LTO included in the negative electrode active material layer 64, it is possible to combine the high increase suppressing performance of the battery temperature during overcharging, and the high storage stability in the high SOC region. The reason for this can be presumed as follows.

Even in use of LPO alone, the effect of improving the heat generation suppressing performance during overcharging is slightly observed. This can be considered due to the fact that the decomposed product derived from LPO forms a protective film on the surfaces of the positive electrode active material and the negative electrode active material. In contrast, the effect of improving the heat generation suppressing performance during overcharging with use of LTO alone is not observed.

When LPO and LTO are used in combination, first, the lithium ion secondary battery is put in an overcharging state. Then, Li is inserted into LTO, resulting in an increase in electric potential. As a result, a region with a high electric potential is locally formed in the negative electrode active material layer. The local electric potential becomes a driving force, thereby promoting the transfer of a substance. Accordingly, a protective film resulting from the decomposed product derived from LPO is positively formed on the surface of the negative electrode active material. This suppresses the exothermic reaction between the negative electrode and the nonaqueous electrolyte caused during overcharging. Accordingly, coexistence of LPO and LTO provides a specifically high heat generation suppressing performance during overcharging. When the LPO and LTO contents are respectively less than respective prescribed amounts, the effect cannot be sufficiently obtained. In contrast, when each content exceeds a prescribed amount, the amount of the decomposed product to be supplied becomes excessive, or the local electric potential serving as the driving force for substance transfer becomes too high. Accordingly, the film becomes ununiform, which results in insufficient effect.

Alternatively, in each case of use of LPO alone and use of LTO alone, the effect of improving the storage stability in the high SOC region cannot be obtained.

When LPO and LTO are used in combination, a protective film is formed on the surface of the negative electrode active material by the same mechanism as that described above. This suppresses the side reaction such as decomposition of a nonaqueous electrolyte leading to capacity deterioration. As a result, the high storage stability in the high SOC region can be obtained. When respective contents of LPO and LTO are less than respective prescribed amounts, respectively, the effect cannot be sufficiently obtained. In contrast, when each content exceeds a prescribed amount, a side reaction due to local overvoltage caused by an excessive amount of the supplied decomposed product occurs. As a result, the effect cannot be sufficiently obtained.

Examples of the separator 70 may include porous sheets (films) including resins such as polyethylene (PE), polypropylene (PP), polyester, cellulose, and polyamide. Such a porous sheet may have a monolayered structure, or may have a two or more-layer lamination structure (e.g., a three-layered structure in which PP layers are stacked on both surfaces of a PE layer). A heat resistant layer (HRL) may be provided on the surface of the separator 70.

The nonaqueous electrolyte typically includes a nonaqueous solvent and a support salt.

Non-limiting Examples of the nonaqueous solvents include, organic solvents such as various carbonates, ethers, esters, nitriles, sulfones, and lactones which are used as the electrolytes in a general lithium ion secondary battery. Out of these, carbonates are desirable. Specific examples thereof may include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluoro dimethyl carbonate (TFDMC). Such nonaqueous solvents can be used alone, or in appropriate combination of two or more thereof.

Desirable examples of the support salts may include lithium salts such as $LiPF_6$ and $LiBF_4$, (and desirably, $LiPF_6$). The concentration of the support salt is desirably 0.7 mol/L or more and 1.3 mol/L or less.

The nonaqueous electrolyte may include other components than the components described above, for example, various additives of gas generating agent such as biphenyl (BP) or cyclohexyl benzene (CHB); and thickener; and the like so long as the effects of the present disclosure are not remarkably impaired.

The lithium ion secondary battery 100 configured as described up to this point is suppressed in increase in battery temperature during overcharging, and is excellent in storage stability (particularly, the capacity deterioration resistance) in the high SOC region.

The lithium ion secondary battery 100 is usable for various uses. The desirable uses may include a driving power supply to be mounted in a vehicle such as an electric vehicle (EV), a hybrid vehicle (HV), or a plug-in hybrid vehicle (PHV). The lithium ion secondary batteries 100 can be typically used in a form of a battery pack including a plurality thereof connected in series and/or in parallel with one another.

As one example, the square lithium ion secondary battery 100 including the flat-shaped wound electrode body 20 was described. However, the lithium ion secondary battery herein disclosed can also be formed as a lithium ion secondary battery including a stacked-type electrode body. Alternatively, the lithium ion secondary battery herein disclosed can also be formed as a cylindrical lithium ion secondary battery, a laminate type lithium ion battery, or the like.

Embodiments regarding the present disclosure will be described below in detail. However, it is not intended to limit the present disclosure to the scope of such embodiments.

Manufacturing of Lithium Ion Secondary Battery for Evaluation of Example and Comparative Example Using a disperser, a paste of a mixture of acetylene black (AB) as a conductive material, polyvinylidene fluoride (PVdF) as a binder, and N-methyl pyrrolidone (NMP) was obtained. To the paste, a mixed powder of $Li_3PO_4$ (LPO) particles, and $LiNi_{0.38}Co_{0.32}Mn_{0.30}O_2$, $LiCoO_2$, or $LiFePO_4$ as the main material (positive electrode active material particles) was added. Then, solid matters were uniformly dispersed therein, thereby preparing a slurry for forming a positive electrode active material layer with a solid content of 50 mass %. The slurry for forming a positive electrode active material layer was prepared so as to achieve positive electrode active material:LPO:AB:PVdF=84-x:x:12:4 (mass ratio) (x is the value listed in Table 1). The slurry was coated onto both surfaces of an elongated aluminum foil in a band shape using a die coater, and was dried, followed by pressing, thereby preparing a positive electrode sheet. The ratios of the average particle diameter of LPO particles to the average particle diameter of positive electrode active material particles were as listed in Table 1.

Further, graphite particles (C) as a negative electrode active material, $Li_4Ti_5O_{12}$ (LTO) particles, styrene butadiene rubber (SBR) as a binder, and carboxymethyl cellulose (CMC) as a thickener were mixed with ion exchanged water at a mass ratio of C:LTO:SBR:CMC=98-y:y:1:1 (y is the value listed in Table 1), thereby preparing a slurry for forming a negative electrode active material layer. The slurry was coated onto both surfaces of an elongated copper foil in a band shape, and was dried, followed by pressing, thereby preparing a negative electrode sheet. The ratio of the average particle diameter of LTO particles to the average particle diameter of negative electrode active material particles was as listed in Table 1.

Further, as separator sheets, two porous polyolefine sheets having a three-layered structure of PP/PE/PP were prepared.

The prepared positive electrode sheet and negative electrode sheet, and the prepared two separator sheets were stacked together, and were wound, thereby preparing a wound electrode body. At this step, it was configured such that the separators were interposed between the positive electrode sheet and the negative electrode sheet. Electrode terminals were attached to the positive electrode sheet and the negative electrode sheet, respectively. This was housed in a battery case having an injection port.

Subsequently, a nonaqueous electrolyte was injected from the injection port of the battery case, and the injection port was hermetically sealed. For the nonaqueous electrolyte, there was used the one obtained by dissolving $LiPF_6$ as a support salt at a concentration of 1.0 mol/L in a mixed solvent including ethylene carbonate (EC), dimethyl carbonate (DMC), and ethyl methyl carbonate (EMC) at a volume ratio of 1:1:1.

In the manner described above, lithium ion secondary batteries for evaluation of examples and comparative examples were prepared.

Activation and Initial Capacity Evaluation

Each of the lithium secondary batteries for evaluation prepared described above was placed in a thermostat set at 25° C. Each lithium secondary battery was constant-current charged to 4.2 V at a current value of ⅓ C. Then, constant-voltage charging was performed until the current value became 1/50 C, resulting in a fully charged state (SOC 100%). Thereafter, constant-current discharging was performed to 3 V at a current value of ⅓ C. The discharge capacity at this step was measured, and this was taken as the initial capacity.

Evaluation of Heating Value during Overcharging

Each activated lithium ion secondary battery for evaluation described above was charged until SOC of 150% was achieved. Then, each lithium ion secondary battery for evaluation was disassembled. Thus, 3 mg of the positive electrode active material layer including the positive electrode active material collected from the positive electrode, and 3 μL of the electrolyte (solution obtained by dissolving $LiPF_6$ at a concentration of 1.0 mol/L in a mixed solvent including EC, DMC, and EMC at a volume ratio of 1:1:1) were placed in a DSC sample container. The sample container was set in a differential scanning calorimeter (DSC), and was raised in temperature at a heating rate of 5° C./min from room temperature up to 400° C. under an Ar atmosphere. The heating value from room temperature up to 200° C. was determined by integration. The ratios of the heating values of respective examples and other comparative examples when the heating value of Comparative Example 1 was taken as 100 were calculated. The results are listed in Table 1.

Hight Temperature Storage Test

Each of the activated lithium ion secondary batteries for evaluation was charged until SOC of 100% was achieved, and then was stored in a thermostat set at 70° C. for 100 days. Then, in the same manner as described above, the discharge capacity of each lithium ion secondary battery for evaluation was measured. The discharge capacity at this step was determined as the battery capacity after high temperature storage. The capacity retention rate (%) was calculated from (battery capacity after high temperature storage/initial capacity)×100. The results are listed in Table 1.

TABLE 1

| | Positive electrode | | Negative electrode | | | LPO/positive electrode active material average particle diameter ratio | LTO/negative electrode active material average particle diameter ratio | | |
|---|---|---|---|---|---|---|---|---|---|
| | Main material (active material) | LPO addition amount x (mass %) | Main material (active material) | LTO addition amount y (mass %) | LPO/LTO content ratio | | | Heating value ratio during overcharging | Capacity retention rate (%) |
| Comparative Example 1 | NCM | 0.0 | C | 0.0 | — | — | — | 100 | 51 |
| Comparative Example 2 | NCM | 3.0 | C | 0.0 | — | 0.4 | — | 91 | 49 |
| Comparative Example 3 | NCM | 0.0 | LTO | 98.0 | — | — | — | 98 | 48 |
| Comparative Example 4 | NCM | 3.0 | LTO | 98.0 | — | 0.4 | — | 91 | 53 |
| Comparative Example 5 | NCM | 0.0 | C | 3.0 | — | — | 0.3 | 102 | 50 |
| Comparative Example 6 | $LiCoO_2$ | 3.0 | C | 0.0 | — | 0.4 | — | 81 | 52 |
| Comparative Example 7 | $LiCoO_2$ | 0.0 | C | 3.0 | — | — | 0.3 | 80 | 49 |
| Comparative Example 8 | $LiFePO_4$ | 3.0 | C | 0.0 | — | 0.4 | — | 63 | 58 |
| Comparative Example 9 | $LiFePO_4$ | 0.0 | C | 3.0 | — | — | 0.3 | 58 | 63 |
| Comparative Example 10 | NCM | 0.4 | C | 3.0 | 0.1 | 0.4 | 0.3 | 91 | 53 |
| Example 1 | NCM | 0.5 | C | 3.0 | 0.2 | 0.4 | 0.3 | 68 | 73 |
| Example 2 | NCM | 3.0 | C | 3.0 | 1.0 | 0.4 | 0.3 | 49 | 80 |
| Example 3 | NCM | 5.0 | C | 3.0 | 1.7 | 0.4 | 0.3 | 72 | 69 |
| Comparative Example 11 | NCM | 6.0 | C | 3.0 | 2.0 | 0.4 | 0.3 | 91 | 48 |
| Comparative Example 12 | NCM | 0.8 | C | 0.4 | 2.0 | 0.4 | 0.3 | 92 | 50 |
| Example 4 | NCM | 0.8 | C | 0.5 | 1.6 | 0.4 | 0.3 | 68 | 73 |
| Example 5 | NCM | 0.8 | C | 5.0 | 0.2 | 0.4 | 0.3 | 71 | 69 |
| Comparative Example 13 | NCM | 0.8 | C | 6.0 | 0.1 | 0.4 | 0.3 | 88 | 51 |
| Example 6 | NCM | 0.9 | C | 3.0 | 0.3 | 0.4 | 0.3 | 71 | 68 |
| Example 7 | NCM | 1.5 | C | 3.0 | 0.5 | 0.4 | 0.3 | 53 | 78 |
| Example 8 | NCM | 3.6 | C | 3.0 | 1.2 | 0.4 | 0.3 | 51 | 82 |
| Example 9 | NCM | 4.5 | C | 3.0 | 1.5 | 0.4 | 0.3 | 72 | 69 |
| Example 10 | NCM | 3.0 | C | 3.0 | 1.0 | 0.6 | 0.3 | 42 | 84 |
| Example 11 | NCM | 3.0 | C | 3.0 | 1.0 | 0.8 | 0.3 | 39 | 83 |
| Example 12 | NCM | 3.0 | C | 3.0 | 1.0 | 1.0 | 0.3 | 41 | 85 |
| Example 13 | NCM | 3.0 | C | 3.0 | 1.0 | 1.2 | 0.3 | 53 | 79 |
| Example 14 | NCM | 3.0 | C | 3.0 | 1.0 | 0.8 | 0.5 | 31 | 88 |
| Example 15 | NCM | 3.0 | C | 3.0 | 1.0 | 0.8 | 0.7 | 33 | 92 |
| Example 16 | NCM | 3.0 | C | 3.0 | 1.0 | 0.8 | 0.8 | 28 | 89 |
| Example 17 | NCM | 3.0 | C | 3.0 | 1.0 | 0.8 | 1.0 | 39 | 84 |
| Example 18 | $LiCoO_2$ | 3.0 | C | 3.0 | 1.0 | 0.4 | 0.3 | 62 | 71 |
| Example 19 | $LiFePO_4$ | 3.0 | C | 3.0 | 1.0 | 0.4 | 0.3 | 41 | 78 |

Comparative Example 1 is a test example using neither of LPO and LTO as a secondary material. In contrast, in Comparative Example 2, LPO was used as a secondary material for the positive electrode. In Comparative Example 2, the heat generation suppressing effect during overcharging was slightly observed, but was insufficient. In Comparative Examples 3 and 4, LTO was used as the main material for the negative electrode. In Comparative Examples 3 and 4, no large difference was observed in characteristics from Comparative Examples 1 and 2. In Comparative Example 5. LTO was used as the secondary material for the negative electrode. In Comparative Example 5, a large difference was not observed in characteristics from Comparative Example 1.

In Comparative Examples 10 to 13 and Examples 1 to 5, both of LPO and LTO were used as the secondary materials. The heating value ratio and the capacity retention rate showed a discontinuous improvement with respect to the LPO content and the LTO content. The results indicate that when the LPO content falls within the range of 0.5 mass % or more and 5 mass % or less, and the LPO content is 0.5 mass % or more and 5 mass % or less, a high heat generation suppressing performance during overcharging, and high storage stability in the high SOC region can be obtained.

Example 2 and Examples 6 to 9 are each an example with the ratio (LPO/LTO) changed therein. The heating value ratio and the capacity retention rate showed a discontinuous improvement with respect to the ratio LPO/LTO. The results indicate that when the ratio LPO/LTO is 0.5 or more and 1.2 or less, the heat generation suppressing performance during overcharging, and the storage stability in the high SOC region are particularly high.

Example 2 and Examples 10 to 13 are each an example with the average particle diameter ratio (LPO/positive electrode active material) changed therein. The heating value ratio and the capacity retention rate showed a discontinuous improvement with respect to this ratio. The results indicate that when the average particle diameter ratio (LPO/positive electrode active material) is 0.6 or more and 1.0 or less, the heat generation suppressing performance during overcharging, and the storage stability in the high SOC region are particularly high.

Example 2 and Examples 14 to 17 are each an example with the average particle diameter ratio (LTO/negative electrode active material) changed therein. The heating value ratio and the capacity retention rate showed a discontinuous improvement with respect to this ratio. The results indicate that when the average particle diameter ratio (LTO/negative electrode active material) is 0.5 or more and 0.8 or less, the heat generation suppressing performance during overcharging, and the storage stability in the high SOC region are particularly high.

Comparative Examples 6 to 9 and Examples 18 and 19 are each an example with the kind of the positive electrode active material changed therein. Even when the kind of the positive electrode active material was changed, the same tendency as described above was observed.

From the description up to this point, in accordance with the lithium ion secondary battery herein disclosed, both of the high heat generation suppressing performance during overcharging and the high storage stability in the high SOC region can be achieved.

As described above, specific examples of the present disclosure were described in detail. However, these are merely illustrative, and are not intended to limit the appended claims. The art described in the appended claims encompasses various changes and modifications of the specific examples exemplified above.

What is claimed is:

1. A lithium ion secondary battery, comprising:
a positive electrode, a negative electrode, and a nonaqueous electrolyte, wherein
the positive electrode has a positive electrode active material layer,
the positive electrode active material layer includes a positive electrode active material, acetylene black as a conductive material, polyvinylidene fluoride as a first binder, and $Li_3PO_4$ as a secondary material,
the positive electrode active material is a lithium-nickel-manganese composite oxide,
a content of the positive electrode active material in the positive electrode active material layer is 70 mass % or more,
a content of the conductive material in the positive electrode active material layer is 3 mass % or more and 13 mass % or less,
a content of the first binder in the positive electrode active material layer is 2 mass % or more and 10 mass % or less,
the negative electrode has a negative electrode active material layer,
the negative electrode active material layer includes a negative electrode active material, styrene butadiene rubber as a second binder, carboxymethyl cellulose as a thickener, and $Li_4Ti_5O_{12}$ as a secondary material,
the negative electrode active material is graphite,
a content of the negative electrode active material in the negative electrode active material layer is 90 mass % or more,
an $Li_3PO_4$ content in the positive electrode active material layer is 0.5 mass % or more and 5.0 mass % or less;
an $Li_4Ti_5O_{12}$ content in the negative electrode active material layer is 0.5 mass % or more and 5.0 mass % or less, and
the ratio of the $Li_3PO_4$ content in the positive electrode active material layer to the $Li_4Ti_5O_{12}$ content in the negative electrode active material layer is 0.2 or more and 1.7 or less.

2. The lithium ion secondary battery according to claim 1, wherein the ratio of the $Li_3PO_4$ content in the positive electrode active material layer to the $Li_4Ti_5O_{12}$ content in the negative electrode active material layer is 0.5 or more and 1.2 or less.

3. The lithium ion secondary battery according to claim 1, wherein the positive electrode active material layer includes the positive electrode active material and $Li_3PO_4$ as particles, and the ratio of the average particle diameter of the $Li_3PO_4$ particles to the average particle diameter of the positive electrode active material particles is 0.6 or more and 1.0 or less.

4. The lithium ion secondary battery according to claim 1, wherein the negative electrode active material layer includes the negative electrode active material particles, and $Li_4Ti_5O_{12}$, and the ratio of the average particle diameter of the $Li_4Ti_5O_{12}$ as particles to the average particle diameter of the negative electrode active material particles is 0.5 or more and 0.8 or less.

5. The lithium ion secondary battery according to claim 1, wherein the negative electrode active material layer consists of the negative electrode active material, styrene butadiene rubber, carboxymethyl cellulose, and $Li_4Ti_5O_{12}$.

* * * * *